(12) United States Patent
Telfer et al.

(10) Patent No.: US 10,705,405 B2
(45) Date of Patent: *Jul. 7, 2020

(54) COMPOSITE PARTICLES AND METHOD FOR MAKING THE SAME

(71) Applicant: E Ink Corporation, Billerica, MA (US)

(72) Inventors: Stephen J. Telfer, Arlington, MA (US); Craig A. Herb, Medford, MA (US); Lee Yezek, Watertown, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,027

(22) Filed: Apr. 6, 2018

(65) Prior Publication Data

US 2018/0267383 A1    Sep. 20, 2018

Related U.S. Application Data

(63) Continuation of application No. 15/463,328, filed on Mar. 20, 2017, now Pat. No. 9,995,987.

(51) Int. Cl.
*G02F 1/167* (2019.01)
*C08K 5/00* (2006.01)
*G02F 1/1675* (2019.01)

(52) U.S. Cl.
CPC ............ *G02F 1/167* (2013.01); *C08K 5/0091* (2013.01); *G02F 2001/1678* (2013.01)

(58) Field of Classification Search
CPC .. G02F 1/167; G02F 2001/1678; C08J 3/215; C08J 2375/02; B01J 13/185; C08K 5/0091

See application file for complete search history.

(56) References Cited

U.S. PATENT DOCUMENTS 3,639,133 A    2/1972  Linton
4,738,898 A    4/1988  Vivant
(Continued)

FOREIGN PATENT DOCUMENTS

JP    H10128103    *  5/1998  .............. B01J 13/16
JP    H10128103 A    5/1998

OTHER PUBLICATIONS

G. Li Æ Y. Q. Feng. X. G. Li. P. Gao. J. Wang. Y. Xie. Preparation and characterization of polyurea microcapsules containing colored electrophoretic responsive fluid, J Mater Sci (2007) 42:4838-4844. (Year: 2007).*

(Continued)

*Primary Examiner* — Bijan Ahvazi
(74) *Attorney, Agent, or Firm* — Ioannis Constantinides

(57) ABSTRACT

A composite particle is provided that includes a base particle and a plurality of hydrophilic oligomeric groups extending from an exterior portion of the base particle, the base particle including a cross-linked polyurea and at least one of a pigment and a dye. The cross-linked polyurea may form a network throughout the base particle. A method of making the composite particle includes providing either a solution containing a dye or a dispersion containing a pigment in a water-dispersible polyfunctional isocyanate dissolved in a water-miscible solvent, forming an emulsion of the solution/dispersion in water, agitating the emulsion while the polyfunctional isocyanate is converted into a cross-linked polyurea, and separating the composite particle containing the cross-linked polyurea and the dye/pigment from the emulsion.

6 Claims, 2 Drawing Sheets

(56) References Cited

U.S. PATENT DOCUMENTS

| | | |
|---|---|---|
| 4,986,015 A | 1/1991 | Ackeret |
| 5,342,556 A * | 8/1994 | Traubel .............. B01J 13/14 |
| | | 264/4.7 |
| 5,763,548 A | 6/1998 | Matyjaszewski |
| 5,789,487 A | 8/1998 | Matyjaszewski et al. |
| 5,804,528 A * | 9/1998 | Aoki ..................... B41M 5/30 |
| | | 427/150 |
| 5,807,937 A | 9/1998 | Matyjaszewski |
| 5,945,491 A | 8/1999 | Matyjaszewski |
| 5,961,804 A | 10/1999 | Jacobson |
| 6,017,584 A | 1/2000 | Albert |
| 6,069,205 A | 5/2000 | Wang |
| 6,071,980 A | 6/2000 | Guan |
| 6,111,022 A | 8/2000 | Matyjaszewski et al. |
| 6,120,588 A | 9/2000 | Jacobson |
| 6,120,839 A | 9/2000 | Comiskey |
| 6,121,371 A | 9/2000 | Matyjaszewski |
| 6,124,411 A | 9/2000 | Matyjaszewski |
| 6,137,012 A | 10/2000 | Fagan |
| 6,153,705 A | 11/2000 | Corpart |
| 6,162,882 A | 12/2000 | Matyjaszewski |
| 6,191,225 B1 | 2/2001 | Barkac |
| 6,197,883 B1 | 3/2001 | Schimmel |
| 6,241,921 B1 | 6/2001 | Jacobson |
| 6,262,706 B1 | 7/2001 | Albert |
| 6,262,833 B1 | 7/2001 | Loxley |
| 6,300,932 B1 | 10/2001 | Albert |
| 6,323,989 B1 | 11/2001 | Jacobson |
| 6,350,795 B1 * | 2/2002 | Breton .................... C08K 5/21 |
| | | 523/160 |
| 6,377,387 B1 | 4/2002 | Duthaler |
| 6,515,649 B1 | 2/2003 | Albert |
| 6,538,801 B2 | 3/2003 | Jacobson |
| 6,580,545 B2 | 6/2003 | Morrison |
| 6,652,075 B2 | 11/2003 | Jacobson |
| 6,693,620 B1 | 2/2004 | Herb |
| 6,721,083 B2 | 4/2004 | Jacobson |
| 6,727,881 B1 | 4/2004 | Albert |
| 6,822,782 B2 | 11/2004 | Honeyman |
| 6,831,771 B2 | 12/2004 | Ho |
| 6,866,760 B2 | 3/2005 | Paolini, Jr. |
| 6,870,661 B2 | 3/2005 | Pullen et al. |
| 6,914,713 B2 | 7/2005 | Chung |
| 6,922,276 B2 | 7/2005 | Zhang |
| 6,927,892 B2 | 8/2005 | Ho |
| 6,956,690 B2 | 10/2005 | Yu |
| 6,958,849 B2 | 10/2005 | Chen |
| 6,982,178 B2 | 1/2006 | LeCain et al. |
| 7,002,728 B2 | 2/2006 | Pullen |
| 7,012,600 B2 | 3/2006 | Zehner |
| 7,038,655 B2 | 5/2006 | Herb |
| 7,052,766 B2 | 5/2006 | Zang |
| 7,072,095 B2 | 7/2006 | Liang |
| 7,075,502 B1 | 7/2006 | Drzaic |
| 7,110,162 B2 | 9/2006 | Wu |
| 7,113,323 B2 | 9/2006 | Ho et al. |
| 7,116,318 B2 | 10/2006 | Amundson |
| 7,141,688 B2 | 11/2006 | Feng |
| 7,142,351 B2 | 11/2006 | Chung |
| 7,144,942 B2 | 12/2006 | Zang |
| 7,170,670 B2 | 1/2007 | Webber |
| 7,180,649 B2 | 2/2007 | Morrison et al. |
| 7,226,550 B2 | 6/2007 | Hou |
| 7,230,750 B2 | 6/2007 | Whitesides |
| 7,230,751 B2 | 6/2007 | Whitesides et al. |
| 7,236,290 B1 | 6/2007 | Zhang |
| 7,247,379 B2 | 7/2007 | Pullen et al. |
| 7,277,218 B2 | 10/2007 | Hwang |
| 7,286,279 B2 | 10/2007 | Yu |
| 7,312,784 B2 | 12/2007 | Baucom |
| 7,312,916 B2 | 12/2007 | Pullen |
| 7,339,715 B2 | 3/2008 | Webber |
| 7,375,875 B2 | 5/2008 | Whitesides |
| 7,382,514 B2 | 6/2008 | Hsu |
| 7,390,901 B2 | 6/2008 | Yang |
| 7,411,719 B2 | 8/2008 | Paolini, Jr. |
| 7,411,720 B2 | 8/2008 | Honeyman et al. |
| 7,453,445 B2 | 11/2008 | Amundson |
| 7,473,782 B2 | 1/2009 | Yang |
| 7,532,388 B2 | 5/2009 | Whitesides et al. |
| 7,532,389 B2 | 5/2009 | Li |
| 7,535,624 B2 | 5/2009 | Amundson et al. |
| 7,572,394 B2 | 8/2009 | Gu |
| 7,576,904 B2 | 8/2009 | Chung |
| 7,580,180 B2 | 8/2009 | Ho |
| 7,679,814 B2 | 3/2010 | Paolini, Jr. |
| 7,715,088 B2 | 5/2010 | Liang |
| 7,737,196 B2 | 6/2010 | Ganapathiappan |
| 7,746,544 B2 | 6/2010 | Comiskey |
| 7,767,112 B2 | 8/2010 | Hou |
| 7,839,564 B2 | 11/2010 | Whitesides et al. |
| 7,848,006 B2 | 12/2010 | Wilcox |
| 7,903,319 B2 | 3/2011 | Honeyman |
| 7,951,938 B2 | 5/2011 | Yang |
| 8,009,348 B2 | 8/2011 | Zehner |
| 8,018,640 B2 | 9/2011 | Whitesides |
| 8,115,729 B2 | 2/2012 | Danner |
| 8,119,802 B2 | 2/2012 | Moonen et al. |
| 8,199,395 B2 | 6/2012 | Whitesides |
| 8,257,614 B2 | 9/2012 | Gu |
| 8,270,064 B2 | 9/2012 | Feick |
| 8,305,341 B2 | 11/2012 | Arango |
| 8,361,620 B2 | 1/2013 | Zang |
| 8,363,306 B2 | 1/2013 | Du et al. |
| 8,390,918 B2 | 3/2013 | Wilcox |
| 8,582,196 B2 | 11/2013 | Walls |
| 8,593,718 B2 | 11/2013 | Comiskey |
| 8,654,436 B1 | 2/2014 | Feick |
| 8,902,491 B2 | 12/2014 | Wang |
| 8,961,831 B2 | 2/2015 | Du |
| 9,052,564 B2 | 6/2015 | Sprague |
| 9,114,663 B2 | 8/2015 | Ho |
| 9,158,174 B2 | 10/2015 | Walls |
| 9,279,906 B2 | 3/2016 | Kang |
| 9,341,915 B2 | 5/2016 | Yang |
| 9,361,836 B1 | 6/2016 | Telfer, Jr. |
| 9,366,935 B2 | 6/2016 | Du |
| 9,372,380 B2 | 6/2016 | Du |
| 9,382,427 B2 | 7/2016 | Du |
| 9,423,666 B2 | 8/2016 | Wang |
| 9,428,649 B2 | 8/2016 | Li |
| 9,557,623 B2 | 1/2017 | Wang |
| 9,664,978 B2 | 5/2017 | Arango |
| 9,670,367 B2 | 6/2017 | Li |
| 9,688,859 B2 | 6/2017 | Yezek |
| 9,726,957 B2 | 8/2017 | Telfer |
| 9,765,015 B2 | 9/2017 | Shao et al. |
| 9,778,537 B2 | 10/2017 | Wang |
| 9,995,987 B1 * | 6/2018 | Telfer ...................... G02F 1/167 |
| 2003/0048522 A1 | 3/2003 | Liang |
| 2003/0151029 A1 | 8/2003 | Hsu |
| 2003/0164480 A1 | 9/2003 | Wu |
| 2004/0030125 A1 | 2/2004 | Li |
| 2005/0012980 A1 | 1/2005 | Wilcox |
| 2008/0257212 A1 * | 10/2008 | Ganapathiappan .. C09D 11/324 |
| | | 106/31.75 |
| 2009/0009852 A1 | 1/2009 | Honeyman |
| 2009/0206499 A1 | 8/2009 | Whitesides |
| 2009/0225398 A1 | 9/2009 | Duthaler |
| 2010/0148385 A1 | 6/2010 | Balko |
| 2011/0217639 A1 | 9/2011 | Sprague |
| 2012/0049125 A1 | 3/2012 | Du |
| 2013/0161565 A1 | 6/2013 | Laxton |
| 2013/0193385 A1 | 8/2013 | Li |
| 2013/0244149 A1 | 9/2013 | Wang |
| 2014/0011913 A1 | 1/2014 | Du |
| 2014/0078024 A1 | 3/2014 | Paolini, Jr. |
| 2014/0078573 A1 | 3/2014 | Comiskey |
| 2014/0078576 A1 | 3/2014 | Sprague |
| 2014/0078857 A1 | 3/2014 | Nelson |
| 2014/0104674 A1 | 4/2014 | Ting |
| 2014/0231728 A1 | 8/2014 | Du |
| 2014/0347718 A1 | 11/2014 | Duthaler et al. |
| 2015/0005720 A1 | 1/2015 | Zang |

(56) References Cited

U.S. PATENT DOCUMENTS

| | | |
|---|---|---|
| 2015/0177590 A1 | 6/2015 | Laxton |
| 2015/0185509 A1 | 7/2015 | Wang |
| 2015/0218384 A1* | 8/2015 | Yezek ............... H01B 1/00 252/519.2 |
| 2015/0241754 A1 | 8/2015 | Du |
| 2015/0248045 A1 | 9/2015 | Sprague |
| 2015/0277160 A1 | 10/2015 | Laxton |
| 2015/0301425 A1 | 10/2015 | Du |
| 2016/0012710 A1 | 1/2016 | Lu |
| 2016/0085132 A1 | 3/2016 | Telfer et al. |
| 2016/0170106 A1 | 6/2016 | Wang |

OTHER PUBLICATIONS

Wang, J.S. et al; "Controlled/'Living' Radical Polymerization. Halogen Atom Transfer Radical Polymerization Promoted a Cu(I)/Cu(II) Redox Process"; Macromolecules, vol. 28, No. 23; pp. 7901-7910 (1995).

Beers, K. et al; "Atom Transfer Radical Polymerization of 2-Hydroxyethyl Methacrylate"; Macromolecules, vol. 32, No. 18; pp. 5772-5576 (1999).

Korean Intellectual Property Office, PCT Appl. No. PCT/US2018/026214, International Search Report and Written Opinion, dated Dec. 21, 2018.

* cited by examiner

COMPOSITE PARTICLES AND METHOD FOR MAKING THE SAME

REFERENCE TO RELATED APPLICATION

This application is a continuation of application Ser. No. 15/463,328 filed Mar. 20, 2017, the content of which is incorporated by reference herein in its entirety.

FIELD OF THE INVENTION

This invention relates to composite particles used in electrophoretic display media, as well as to the improved methods of manufacturing the composite particles.

BACKGROUND OF INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, such as black and white, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. Some particle-based electrophoretic displays are stable not only in their extreme black and white states but also in three or more states, such as multi-color displays having three or more colors. For convenience the term "bistable" may be used herein to cover display elements having two or more display states.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,119,802; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/0281924; 2007/0268567; 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/0248045; 2015/0301425; 2015/0378236; 2016/0139483; and 2016/0170106;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

In the design of electrophoretic displays, it is frequently necessary to tailor the properties of electrokinetically mobile pigment particles to satisfy multiple criteria, and it is not uncommon that the demands of one criterion conflict with those of another. For example, it may be required to provide an optically transparent colored pigment that is readily switched by a dielectrophoretic mechanism. In order for such a pigment to exhibit transparency, it must comprise particles small enough not to scatter visible light. However, in order to be switched dielectrophoretically, a particle should ideally be large, so that a field gradient may induce a substantial dipole moment. One way to satisfy both demands is to construct a composite particle in which small pigment particles (required for transparency) are incorporated into a large super-particle (that exhibits appropriate dielectrophoretic mobility). Thus, there is a need for efficient methods of incorporating small pigment particles into large composites that can themselves be functionalized appropriately for electrokinetic mobility.

SUMMARY OF THE INVENTION

According to one aspect of the present invention, a composite particle is provided that comprises, a base particle and a plurality of hydrophilic oligomeric groups on an exterior portion of the base particle, the base particle including a cross-linked polyurea and at least one of a pigment and a dye. The cross-linked polyurea may form a network throughout the base particle.

According to another aspect of the present invention, a method of making a composite particle is provided. The method comprises providing either a solution containing a dye or a dispersion containing a pigment in a water-dispersible polyfunctional isocyanate dissolved in a water-miscible solvent, forming an emulsion of the solution/dispersion in water, agitating the emulsion while the polyfunctional isocyanate is converted into a cross-linked polyurea, and separating the composite particle containing the cross-linked polyurea and the dye/pigment from the emulsion.

It is yet another aspect of the present invention to provide an electrophoretic medium comprising a plurality of electrically charged particles disposed in a fluid and capable of moving through the fluid under the influence of an electric field, wherein at least one of the particles is produced by a process according to an embodiment of the present invention. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous. The electrophoretic material containing the electrophoretic medium may be incorporated into an electrophoretic display comprising a layer of the electrophoretic material and at least one electrode arranged to apply an electric field to the layer of electrophoretic material.

The displays incorporating the electrophoretic medium made according to the various embodiments of the present invention may be used in any application in which prior art electro-optic displays have been used. Thus, for example, the present displays may be used in electronic book readers, portable computers, tablet computers, cellular telephones, smart cards, signs, watches, shelf labels, variable transmission windows and flash drives.

These and other aspects of the present invention will be apparent in view of the following description.

BRIEF DESCRIPTION OF THE FIGURES

The drawing Figures depict one or more implementations in accord with the present concepts, by way of example only.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The composite particles according to the various embodiments of the present invention comprise a cross-linked polyurea that forms a network throughout a base particle. As used herein in the specification and the claims, forming "a network throughout a base particle" means that the cross-linked polyurea is present at multiple locations/radii within the entire thickness of the base particle. Therefore, excluded from the definition of "a network throughout a base particle" would be a polyurea shell of a microcapsule because the shell is generally present only around the outer periphery of the microcapsule, for example.

In one method according to an embodiment of the present invention, the cross-linked polyurea may be obtained from a water-dispersible polyfunctional isocyanate. On contact with water, the isocyanate group of a polyfunctional isocyanate hydrolyzes, releasing carbon dioxide and forming an amine. Amino groups react more readily than water with isocyanates; therefore, the newly-formed amine is likely to react with a neighboring, unhydrolyzed isocyanate. This reaction produces a urea group, and thus the final result of the reaction is a crosslinked polyurea that also contains some free amino groups.

Figure 1:
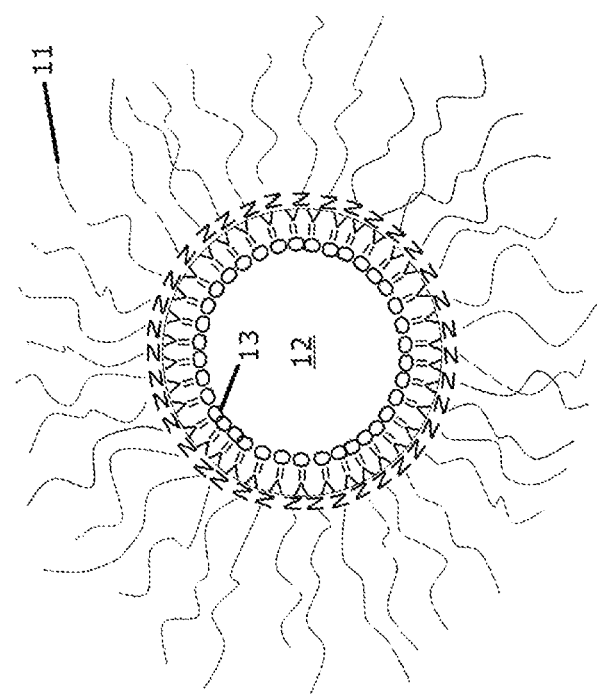
FIG. 1 is a schematic representation of a Prior Art method of forming a microcapsule.
Figure 1:
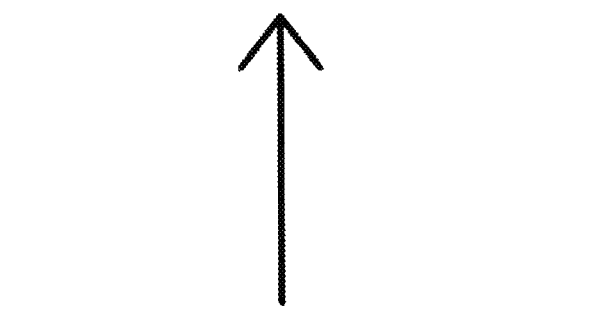
Figure 1:
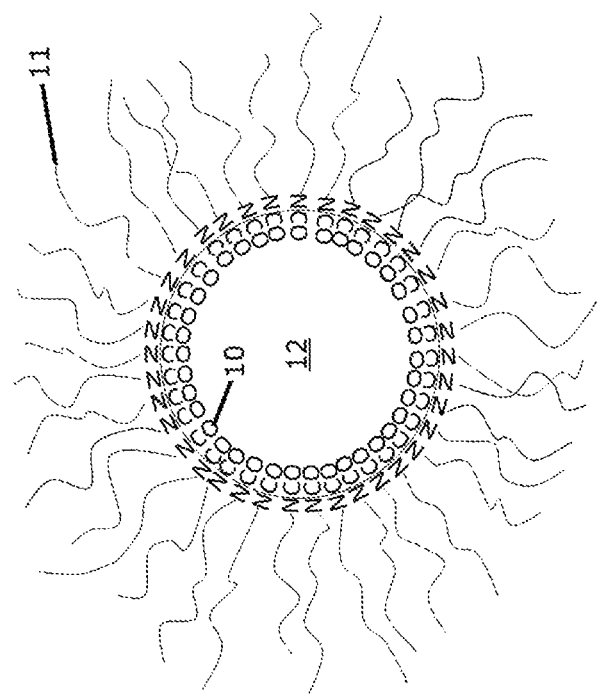

Water-dispersible polyfunctional isocyanates typically contain a hydrophilic oligomeric group (often an aliphatic oligomer, such as poly(ethylene oxide)) and multiple isocyanate groups. The portion of the molecule that bears the isocyanate groups is essentially insoluble in water. When the polyfunctional isocyanates are combined with an immiscible solvent and emulsified in a continuous aqueous phase, the mixture of polyfunctional isocyanates and solvent form micelles, as illustrated in FIG. 1, wherein the poly(ethylene oxide) units (11) of the polyfunctional isocyanates are solvated by water and stabilize the water interface while the more hydrophobic interior of the micelle contains most of the isocyanate functionality (10). The isocyanate groups (10) may react as described above to form a polyurea shell (13) around the immiscible solvent (12) to form a microcapsule.

Figure 2:
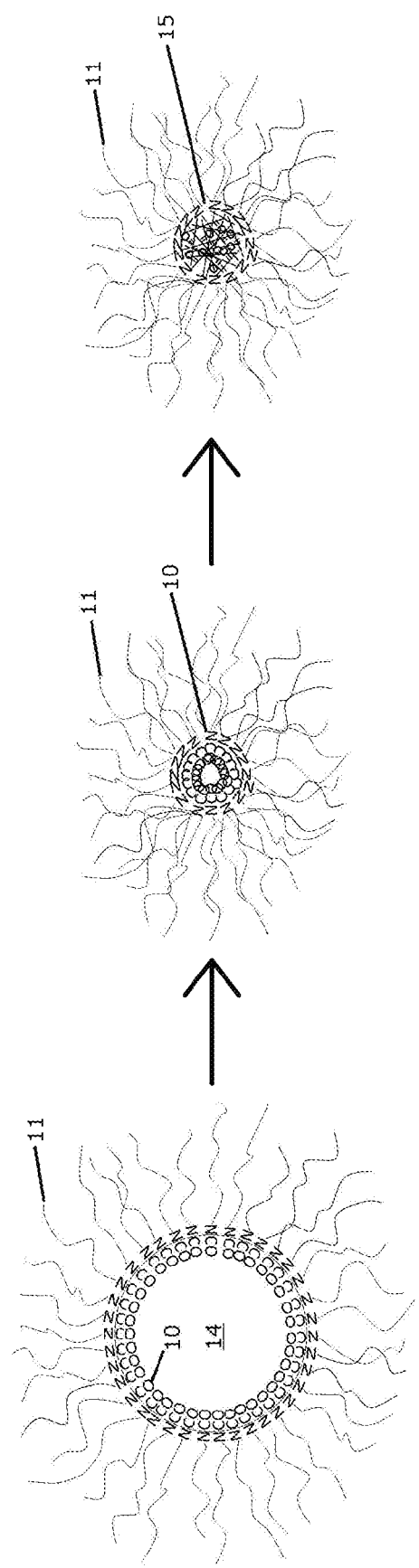
FIG. 2 is a schematic representation of a method of forming a composite particle according to an embodiment of the present invention.

Without wishing to be bound by theory, it is believed that by first dissolving the water-dispersible polyfunctional isocyanates in a water-miscible solvent, a composite particle may be formed having a polyurea network throughout a base particle of the composite. Referring to FIG. 2, which is a schematic representation of an embodiment of the invention, a mixture of a water-dispersible polyfunctional isocyanate and water-miscible solvent is introduced to water (with agitation), such that solvent droplets (14) stabilized at the aqueous interface by the hydrophilic oligomeric groups (11) will be formed. Diffusion of water into the solvent droplet (14) will cause the polyfunctional isocyanates to polymerize by the hydrolysis reaction and amine condensation described above, while diffusion of the solvent (14) from the droplets into the aqueous phase will cause the droplets to shrink. At equilibrium the droplet will contain very little solvent and the result is a base particle comprising mostly cross-linked polyurea (15) throughout the thickness of the base particle and whatever other materials were originally dissolved or dispersed in the solvent. For example, by introducing a soluble dye or insoluble pigment in the solution of water-miscible solvent and water-dispersible polyfunctional isocyanates, a composite particle results having a base particle in which the dye or pigment is captured within a polyurea network formed after polymerization in the aqueous phase.

Therefore, the various methods for manufacturing a composite particle according to the present invention include first either dissolving a dye and a water-dispersible polyfunctional isocyanate in a water-miscible solvent or dispersing a pigment in a solution of the water-dispersible polyfunctional isocyanate and water-miscible solvent. The weight ratio of water-dispersible polyfunctional isocyanate to water-miscible solvent is preferably 1:3 to 3:1, most preferably 1:2 to 2:1. The amount of dye or pigment may be dependent on the desired opacity or transparency of the final composite particle.

In a second step, the mixture of dye/pigment, polyfunctional isocyanate, and water miscible solvent is added to an aqueous phase. Optionally, surfactants may be added to the aqueous phase and/or agitation rate may be varied, for example, to control the final particle size.

As noted above, as water diffuses into the aqueous phase, the polyfunctional isocyanates will crosslink via the previously described hydrolysis reaction and amine condensation. The degree of crosslinking will be dependent on the temperature and on the time allowed for reaction to occur. Extending the length of time that the dyed solution/pigment dispersion droplets are exposed to the aqueous phase will increase the degree of crosslinking.

When a desired degree of crosslinking is achieved, the resulting composite particles containing the crosslinked polyurea network and dye/pigment may be separated from the aqueous phase (which contains the dissolved solvent). This may be achieved using any separation methods known by those of skill in the art including, but not limited to, filtration, centrifugation, drying, and combinations thereof. It is preferred that most if not all of the water be removed from the composite for further processing, as will be described in greater detail below. Preferably the particles are separated from the aqueous phase by centrifugation, after which they may be dried to remove residual water and solvent.

Water-dispersible polyfunctional isocyanates that may be used to form the composite particles according to the various embodiments of the present invention are known to those of skill in the art, such as those sold under the tradename Bayhydur manufactured by Bayer Corporation. The water dispersible polyfunctional isocyanates preferably have an NCO content of about 5 to 35%, more preferably about 15-25%.

Water-miscible solvents that may be used in the methods for forming the composite particles according to the various embodiments of the present invention are preferably organic solvents in which the water-dispersible polyfunctional isocyanates are soluble. Such solvents are known to those of skill in the art and include, but are not limited to, tetrahydrofuran (THF), ketones and esters. The solvent should not contain nucleophilic groups that might react with the isocyanates. One especially preferred water-miscible solvent is methyl acetate. The preferred water solubility of the water miscible solvent is at least 5%, more preferably at least 25% by weight. The dyes and pigments that may be used in the composite particles according to the various embodiments of the present invention are also known to those of skill in the art. The dyes are preferably soluble in one or both of the water-dispersible polyfunctional isocyanates and the water-miscible solvent. The dyes and pigments are also preferably insoluble in water and insoluble in the non-polar solvent of the electrophoretic medium in which the composite particles will be added. Soluble dyes that may be incorporated in the composite particles according to the present invention include, but are not limited to Solvent Blue 70, Solvent Blue 67, Solvent Blue 136, Solvent Red 127, Solvent Red 130, Solvent Red 233, Solvent Red 125, Solvent Red 122, Solvent Yellow 88, Solvent Yellow 146, Solvent Yellow 25, Solvent Yellow 89, Solvent Orange 11, Solvent Orange 99, Solvent Brown 42, Solvent Brown 43, Solvent Brown 44, Solvent Black 28, and Solvent Black 29.

Pigments that are insoluble in the water-miscible solvents and water-dispersible polyfunctional isocyanates may alternatively be used in the methods to prepare the composite particles of the present invention. The pigments may be combined with the polyfunctional isocyanate/solvent solutions to form a pigment dispersion and that are subsequently introduced into the aqueous phase. Pigments that may be incorporated in the composite particles according to the present invention include, but are not limited to inorganic pigments, neat pigments, laked pigments, and organic pigments.

Examples of inorganic pigments include, but are not limited to, $TiO_2$, $ZrO_2$, ZnO, $Al_2O_3$, CI pigment black 26 or 28 or the like (e.g., manganese ferrite black spinel or copper chromite black spinel). Particles, such as titania particles may be coated with a metal oxide, such as aluminum oxide or silicon oxide, for example.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (3023S), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF)(30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 µm), Statex B-12 (Columbian Carbon Co.) (a furnace black of 33 µm average particle size), and chrome green.

Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

Organic pigment particles may include, but are not limited to, CI pigment PR 254, PR122, PR149, PG36, PG58, PG7, PB28, PB15:1, PB15:2, PB15:3, PB1:4, PY83, PY138, PY150, PY155 or PY20, as well as other commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The color provided by the dyes/pigments of the composite particles according to the present invention may be white, black, red, green, blue, cyan, magenta, or yellow, for example. In addition to their color, the particles may have other distinct optical characteristics, such as optical transmission, reflectance, luminescence, or, in the case of display media intended for machine reading, pseudo-color in the sense of a change in reflectance of electromagnetic wavelengths outside the visible range.

It is also noted that the composite particles may have different particle sizes. Useful sizes may range from 1 nm up to about 100 µm. For example, smaller particles may have a size which ranges from about 50 nm to about 800 nm. Larger particles may have a size which is about 2 to about 50 times, and more preferably about 2 to about 10 times, the sizes of the smaller particles.

The composite particles made according to the various embodiments of the present invention may be further treated for surface modification. Such surface modification processes are known to those of skill in the art, like the processes disclosed in U.S. Patent Application No. 2015/0218384, the contents of which are incorporated herein by reference.

For example, the stability of electrophoretic media may be improved by either chemically bonding or cross-linking a steric stabilizing polymer around the outside of the composite particle. The polymeric stabilizer determines the particle size and colloidal stability of the system and preferably has a long polymeric chain which may stabilize the composite particles in a hydrocarbon solvent. The steric stabilizing polymer is preferably from about 1 to about 15 percent by weight of the composite particle.

These polymer-coated composite particles may be prepared by a process comprising (a) reacting the particle with a reagent having a functional group capable of reacting with, and bonding to, the particle, and also having a polymerizable or polymerization-initiating group, thereby causing the functional group to react with the particle surface and attach the polymerizable group thereto; and (b) reacting the product of step (a) with at least one monomer or oligomer under conditions effective to cause reaction between the polymerizable or polymerization-initiating group on the particle and the at least one monomer or oligomer, thereby causing the formation of polymer bonded to the particle.

Because the composite particles made according to the various embodiments of the present invention will likely have available amine groups on the surface of the particle, the available amine groups may be with a reagent in a step (a) as described above having at least one functional group capable of reacting with the amine and at least one polymerizable group. For example, the reagent for use in step (a) (the so-called "surface functionalization" step) of this process may include an isocyanate group and an acrylate group, such as isocyanate ethyl acrylate. Alternatively, step (a) and (b) may be replaced with a single step by using a reagent that is already in polymeric form, if the steric stabilizing polymer includes a functional group, such as an isocyanate group, that may react with the amine groups on the surface of the composite particle.

If a reagent, such as isocyanate ethyl acrylate, is used in a step (a), as described above, the polymeric stabilizer may be derived from one or more monomers or macromonomers using various polymerization techniques known by those of skill in the art. For example, the polymeric stabilizer may be obtained by random graft polymerization (RGP), ionic random graft polymerization (IRGP), and atom transfer radical polymerization (ATRP), as described in U.S. Pat. No. 6,822,782, the contents of which are incorporated herein by reference in its entirety. As used herein throughout the specification and the claims, "macromonomer" means a macromolecule with one end-group that enables it to act as a monomer.

Suitable monomers for forming the polymeric stabilizer may include, but are not limited to, styrene, alpha methyl styrene, methyl acrylate, methyl methacrylate, n-butyl acrylate, n-butyl methacrylate, t-butyl acrylate, t-butyl methacrylate, vinyl pyridine, N-vinylpyrrolidone, 2-hydoxyethyl acrylate, 2-hydroxyethyl methacrylate, dimethylaminoethyl methacrylate, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate, 2-perfluorobutylethyl acrylate, 2,2,2-trifluoroethyl methacrylate, 2,2,3,3-tetrafluoropropyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate, 2,2,3,3-tetrafluoropropyl acrylate, 2,2,3,4,4,4-hexafluorobutyl methacrylate, and 2,2,3,3,4,4,4-heptafluorobutyl methacrylate or the like. The macromonomer may contain a terminal functional group selected from the group consisting of an acrylate group, a vinyl group, or combinations thereof.

In describing the reagents used to provide the desired polymerizable or initiating functionality, we do not exclude the possibility that the polymeric stabilizer may be "bifunctional." For example, polymerization initiators are known (such as 4,4'-azobis(4-cyanovaleric acid)) having more than one ionic site, and such initiators may be used in the present process. Also, as previously noted, a bifunctional compound may have the form of a macromonomer containing repeating units having the capacity to bond to the particle surface and other repeated units having the desired polymerizable or initiating functionality, and such macromonomeric bifunctional compounds may form polymeric stabilizers that will normally contain multiple repeating units of both these types.

When choosing the bifunctional compound to provide polymerizable or initiating functionality on the particle, attention should be paid to the relative positions of the two groups within the reagent. As should be apparent to those skilled in polymer manufacture, the rate of reaction of a polymerizable or initiating group bonded to a particle may vary greatly depending upon whether the group is held rigidly close to the particle surface, or whether the group is spaced (on an atomic scale) from that surface and can thus extend into a reaction medium surrounding the particle, this being a much more favorable environment for chemical reaction of the group. In general, it is preferred that there be at least three atoms in the direct chain between the two functional groups.

In an alternative surface treatment method, the composite particles may be treated by physi-sorption of a reagent comprising polymerizable groups on to the surface of the composite particles by treating the particle with a solution of a reagent having a polymerizable or polymerization-initiating group, thereby causing the reagent to become physisorbed on to the particle surface such that the reagent will not desorb from the particle surface when the particle is placed in a hydrocarbon medium. This process, as disclosed in U.S. Patent Application No. 2015/0218384, may further comprise reacting the composite particle with the reagent physi-sorbed thereon with at least one monomer or oligomer under conditions effective to polymerize the polymerizable or polymerization-initiating group on the particle with the at least one monomer or oligomer.

For example in one embodiment, the physi-sorption reagent may be dissolved in an ionic solvent or solvent mixture, such as a water/ethanol mixture. The process may include adjusting the pH of the solution of the reagent to control the charge on the composite particle, and choosing the reagent to physi-sorb depending upon the desired charge on the particle. As is well known to those skilled in pigment chemistry, the charge on many pigment particles in ionic liquids depends upon the pH of the liquid, there typically being one pH (the isoelectric point) at which the particle is uncharged. Above the isoelectric point of the pigment, the pigment is negatively charged and the reagent may contain a quaternary ammonium salt grouping (much in the way organo-clays are prepared), while below the isoelectric point, the positively charged pigment surface can be modified by adsorption of reagents containing anionic functional groups. Reagents with quaternary ammonium salt groupings include: [3-(methacryloyloxy)ethyl]trimethylammonium chloride (MAETAC), [3-(methacryloyloxy)ethyl]trimethylammonium methyl sulfate, and [3-(methacryloylamino)propyl]trimethylammonium chloride. Reagents with anionic functional groups include 3-sulfopropyl methacrylate potassium salt (SPMK) and sodium 4-vinylbenzenesulfonate. The process is not restricted to pigments having inorganic oxide surfaces, and in principle may be extended to any pigments which can be charged sufficiently to promote adsorption of the functionalizing reagent. The reagent which is physisorbed on to the surface of the pigment particle should desirably be chosen so that it becomes essentially irreversibly bound to the composite particle in the low dielectric constant solvents (typically aliphatic hydrocarbons) used in the polymerization step and in the internal phase of the final electrophoretic display.

In another surface treatment method, because amine groups on the surface of the composite particles are nucleophilic, the composite particles may be treated with a reagent having a polymerizable or polymerization-initiating group, and also comprising at least one electrophilic group. The electrophilic groups on the reagent react with the nucleophilic groups on the particle surfaces, thus attaching the polymerizable or polymerization-initiating groups to the particle surface. This process may further comprise reacting the polymerizable or polymerization-initiating groups with at least one of the monomers or macromonomers previously described.

Electrophilic reagents useful in this process include acid halides, such as 4-vinylbenzyl chloride and methacryloyl chloride, and 2-isocyanatoethyl methacrylate. Both benzylic halides and acid chlorides are very reactive with respect to nucleophilic substitution reactions. For example, the coupling reaction with 4-vinylbenzyl chloride results in a styrene group tethered to the surface.

In a variation of the surface treatment described above using an electrophilic reagent, the reagent may exclude a polymerizable or polymerization-initiating group so that a residue of the reagent is chemically bonded to the pigment particle. The reagent may be chosen so that the treatment of the composite particle therewith affects the zeta potential of the pigment particle. The preferred reagents for use in this process are alkyl halides, especially benzyl chloride or bromide. Treatment with either benzyl chloride or bromide shifts the zeta potential of the pigment particle to more positive values.

In yet another surface treatment method, a silica coating may be applied to the composite particle in a first step followed by a polymeric coating obtained by a dispersion polymerization technique, such as the methods described in U.S. Patent Application No. 20160085132, the contents of which are incorporated herein by reference in its entirety. The polymeric coating will serve as a steric stabilizer of the composite particle in an electrophoretic medium, such as a non-polar solvent.

Various coating methods may be employed to provide the composite particle with a silica coating, for example, the coating method described in U.S. Pat. No. 3,639,133, the contents of which are incorporated herein by reference in its entirety. Prior to coating the composite particles, the particles may be prepared by first de-agglomerating and homogenizing an aqueous slurry of the composite particles using methods such as sonication, ball milling, or jet milling. A silica precursor may then be added to the aqueous slurry, such as sodium silicate or tetraethyl orthosilicate. In one process, the composite particles are dispersed in a solution of ethanol and tetraethyl orthosilicate and react at room temperature for 20 hrs under basic conditions to form a generally uniform coating of silica over the particles, wherein the silica content of the coated particles is about 2% to 35% by weight.

After the deposition of the silica coating is complete, the pH of the reaction mixture may be reduced below about 4, and preferably to about 3, before the silica-coated particles are separated from the reaction mixture. The reduction in pH is conveniently effected using sulfuric acid, although other acids, for example, nitric, hydrochloric and perchloric acids, may be used. The silica coated particles are conveniently separated from the reaction mixture by centrifugation. Following this separation, it is not necessary to dry the particles. Instead, the silica-coated particles can be readily re-dispersed in the medium, typically an aqueous alcoholic medium, to be used for the next step of the process for the formation of polymer on the particles. This enables the silica-coated particles to be maintained in a non-agglomerated and non-fused form as they are subjected to the dispersion polymerization processes for attachment of polymerizable or polymerization-initiating groups, thus allowing for thorough coverage of the silica coated particle with such groups, and preventing the formation of large aggregates of particles.

During dispersion polymerization, monomer or a macromonomer containing a radically polymerizable group is polymerized around the silica coated particles in the presence of a bifunctional reagent. The solvent selected as the reaction medium must be a good solvent for both the monomer or macromonomer and the bifunctional reagent, but a non-solvent for the polymer shell being formed. For example, in an aliphatic hydrocarbon solvent of Isopar G®, monomer methylmethacrylate is soluble; but after polymerization, the resulting polymethylmethacrylate is not soluble. The polymeric coating may be derived from various monomers and polymerization techniques known by those of skill in the art, such as those described above (e.g. random graft polymerization (RGP), ionic random graft polymerization (IRGP), and atom transfer radical polymerization (ATRP)).

The bifunctional reagent may be a reactive and polymerizable macromonomer which adsorbs, becomes incorporated or is chemically bonded onto the surface of the silica shell and the polymeric coating. It will be appreciated that because the silica coating completely covers the composite particles, any bifunctional reagent used to attach an initiator or polymerizable group to the surface of the particle must react with the silica coating. The bifunctional reagent may also be an acrylate-terminated or vinyl-terminated macromolecule, which are suitable because the acrylate or vinyl group can co-polymerize with the monomer in the reaction medium that will form the polymer shell. The macromonomer preferably has a long hydrocarbon chain, which may stabilize the composite particles in a hydrocarbon solvent.

The preferred class of functional groups for bonding the bifunctional reagents to silica-coated particles are silane coupling groups, especially trialkoxy silane coupling groups. One especially preferred reagent for attaching a polymerizable group to the silica coating is 3-(trimethoxysilyl)propyl methacrylate, which is available commercially from Dow Chemical Company, Wilmington, Del. under the trade name Z6030. The corresponding acrylate may also be used.

One type of macromonomer for use as a steric stabilizer may be acrylate terminated polysiloxane, such as Gelest, MCR-M11, MCR-M17, or MCR-M22, for example. When choosing the bifunctional stabilizer to provide polymerizable or initiating functionality on the particle, attention should be paid to the relative positions of the two groups within the reagent. As should be apparent to those skilled in polymer manufacture, the rate of reaction of a polymerizable or initiating group bonded to a particle may vary greatly depending upon whether the group is held rigidly close to the particle surface, or whether the group is spaced (on an atomic scale) from that surface and can thus extend into a reaction medium surrounding the particle, this being a much more favorable environment for chemical reaction of the group. In general, it is preferred that there be at least three atoms in the direct chain between the two functional groups; for example, 3-(trimethoxysilyl)propyl methacrylate provides a chain of four carbon and one oxygen atoms between the silyl and ethylenically unsaturated groups.

According to another embodiment of the present invention, the polymeric shell on the silica coated organic pigment particles may be prepared by living radical dispersion polymerization. The living radical dispersion polymerization technique is similar to the dispersion polymerization described above by starting the process with silica coated composite particles and monomer and/or macromonomer dispersed in a reaction medium. However in this alternative process, multiple living ends are formed on the surface of the shell. The living ends may be created by adding an agent such as TEMPO (2,2,6,6-tetramethyl-1-piperidinyloxy), a RAFT (reversible addition-fragmentation chain transfer) reagent or the like, in the reaction medium, for the living radical polymerization.

A second monomer and/or macromonomer added to the reaction medium will react with the living ends of the bifunctional reagent to form the polymeric coating. The monomers may include any of the monomers or comonomers previously listed.

In any of the processes described above, the quantities of the reagents, composite particles, monomer and/or macromonomers used may be adjusted and controlled to achieve the desired organic content in the resulting composite pigment particles. Furthermore, the processes of the present invention may include more than one stage and/or more than one type of polymerization.

As previously mentioned, the composite pigments of the present invention may be incorporated into electrophoretic media used for electro-optic displays. One or more of the composite particles may be dispersed in an encapsulated dispersion fluid, such as a dielectric solvent or solvent mixture. The dispersion fluid may be encapsulated according to any method known to those of skill in the art, e.g. microcapsules, microcells, or a polymer matrix, and to any size or shape, such as spherical, for example, and may have diameters in the millimeter range or the micron range, but are preferably from about ten to about a few hundred microns. The percentages of the composite particles in the fluid may vary. For example, the particles may take up 0.1% to 50%, preferably 0.5% to 15%, by volume of the electrophoretic fluid.

It is desirable that the polymeric stabilizer be highly compatible with the encapsulated dispersion fluid. In practice, the suspending fluid in an electrophoretic medium is normally hydrocarbon-based and non-polar (e.g. C6-C18 branched alkanes), although the fluid can include a proportion of halocarbon, which is used to increase the density of the fluid and thus to decrease the difference between the density of the fluid and that of the particles. Accordingly, it is important that the polymeric stabilizer formed in the present processes be highly compatible with the encapsulated fluid, and thus that the polymeric stabilizer itself comprise a major proportion of hydrocarbon chains; except for groups provided for charging purposes, as discussed below, large numbers of strongly ionic groups are undesirable since they render the polymeric stabilizer less soluble in the hydrocarbon suspending fluid and thus adversely affect the stability of the particle dispersion. Also, as already discussed, at least when the medium in which the particles are to be used comprises an aliphatic hydrocarbon suspending fluid (as is commonly the case), it is advantageous for the polymeric stabilizer to have a branched or "comb" structure, with a main chain and a plurality of side chains extending away from the main chain. Each of these side chains should have at least about four, and preferably at least about six, carbon atoms. Substantially longer side chains may be advantageous; for example, some of the preferred polymeric stabilizers may have lauryl ($C_{12}$) side chains. The side chains may themselves be branched; for example, each side chain could be a branched alkyl group, such as a 2-ethylhexyl group. It is believed (although the invention is in no way limited by this belief) that, because of the high affinity of hydrocarbon chains for the hydrocarbon-based suspending fluid, the branches of the polymeric stabilizers spread out from one another in a brush or tree-like structure through a large volume of liquid, thus increasing the affinity of the particle for the suspending fluid and the stability of the particle dispersion.

There are two basic approaches to forming such a comb polymer. The first approach uses monomers which inherently provide the necessary side chains. Typically, such a monomer has a single polymerizable group at one end of a long chain (at least four, and preferably at least six, carbon atoms). Monomers of this type which have been found to give good results in the present processes include hexyl acrylate, 2-ethylhexyl acrylate and lauryl methacrylate. Isobutyl methacrylate and 2,2,3,4,4,4-hexafluorobutyl acrylate have also been used successfully. In some cases, it may be desirable to limit the number of side chains formed in such processes, and this can be achieved by using a mixture of monomers (for example, a mixture of lauryl methacrylate and methyl methacrylate) to form a random copolymer in which only some of the repeating units bear long side chains. In the second approach, typified by an RGP-ATRP process, a first polymerization reaction is carried out using a mixture of monomers, at least one of these monomers bearing an initiating group, thus producing a first polymer containing such initiating groups. The product of this first polymerization reaction is then subjected to a second polymerization, typically under different conditions from the first polymerization, so as to cause the initiating groups within the polymer to cause polymerization of additional monomer on to the original polymer, thereby forming the desired side chains. As with the bifunctional reagents discussed above, we do not exclude the possibility that some chemical modification of the initiating groups may be effected between the two polymerizations. In such a process, the side chains themselves do not need to be heavily branched and can be formed from a small monomer, for example methyl methacrylate.

Free radical polymerization of ethylenic or similar radical polymerizable groups attached to particles may be effected at elevated reaction temperatures, preferably 60 to 70 C, using conventional free radical initiators, such as azobis (isobutyrynitrile) (AIBN), while ATRP polymerization can be effected using the conventional metal complexes, as described in Wang, J. S., et al., Macromolecules 1995, 23, 7901, and J. Am. Chem. Soc. 1995, 117, 5614, and in Beers, K. et al., Macromolecules 1999, 32, 5772-5776. See also U.S. Pat. Nos. 5,763,548; 5,789,487; 5,807,937; 5,945,491; 4,986,015; 6,069,205; 6,071,980; 6,111,022; 6,121,371; 6,124,411; 6,137,012; 6,153,705; 6,162,882; 6,191,225; and 6,197,883. The entire disclosures of these papers and patents are herein incorporated by reference. The presently preferred catalyst for carrying out ATRP is cuprous chloride in the presence of bipyridyl (Bpy).

RGP processes of the invention in which particles bearing polymerizable groups are reacted with a monomer in the presence of an initiator will inevitably cause some formation of "free" polymer not attached to a particle, as the monomer in the reaction mixture is polymerized. The unattached polymer may be removed by repeated washings of the particles with a solvent (typically a hydrocarbon) in which the unattached polymer is soluble, or (at least in the case of metal oxide or other dense particles) by centrifuging off the treated particles from the reaction mixture (with or without the previous addition of a solvent or diluent), redispersing the particles in fresh solvent, and repeating these steps until the proportion of unattached polymer has been reduced to an acceptable level. (The decline in the proportion of unattached polymer can be followed by thermogravimetric analysis of samples of the polymer.) Empirically, it does not appear that the presence of a small proportion of unattached polymer, of the order of 1 percent by weight, has any serious deleterious effect on the electrophoretic properties of the treated particles; indeed, in some cases, depending upon the chemical natures of the unattached polymer and the suspending fluid, it may not be necessary to separate the particles having attached polymeric stabilizers from the unattached polymer before using the particles in an electrophoretic display.

As already indicated, it has been found that there is an optimum range for the amount of polymeric stabilizer which should be formed on electrophoretic particles, and that forming an excessive amount of polymer on the particles can degrade their electrophoretic characteristics. The optimum range will vary with a number of factors, including the density and size of the particles being coated, the nature of the suspending medium in which the particles are intended to be used, and the nature of polymer formed on the particles, and for any specific particle, polymer and suspending medium, the optimum range is best determined empirically. However, by way of general guidance, it should be noted that the denser the particle, the lower the optimum proportion of polymer by weight of the particle, and the more finely divided the particle, the higher the optimum proportion of polymer. In general, the particles should be coated with at least about 2, and desirably at least about 4, percent by weight of the particle. In most cases, the optimum proportion of polymer will range from about 4 to about 15 percent by weight of the particle, and typically is about 6 to about 15 percent by weight, and most desirably about 8 to about 12 percent by weight.

To incorporate functional groups for charge generation of the pigment particles, a co-monomer may be added to the polymerization reaction medium. The co-monomer may either directly charge the composite pigment particles or have interaction with a charge control agent in the display fluid to bring a desired charge polarity and charge density to the composite pigment particles. Suitable co-monomers may include acrylic acid, methacrylic acid, vinyl phosphoric acid, 2-acrylamino-2-methylpropane sulfonic acid, 2-(dimethylamino)ethyl methacrylate, N-[3-(dimethylamino)propyl]methacrylamide and the like. Suitable co-monomers may also include fluorinated acrylate or methacrylate such as 2-perfluorobutylethyl acrylate, 2,2,2 trifluoroethyl methacrylate, 2,2,3,3 tetrafluoropropyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate, 2,2,3,3-tetrafluoropropyl acrylate, 2,2,3,4,4,4-hexafluorobutyl methacrylate or 2,2,3,3,4,4,4-heptafluorobutyl methacrylate. Alternatively, charged or chargeable groups may be incorporated into the polymer via the bifunctional stabilizer used to provide polymerizable or initiating functionality to the pigment.

Functional groups, such as acidic or basic groups, may be provided in a "blocked" form during polymerization, and may then be de-blocked after formation of the polymer. For example, since ATRP cannot be initiated in the presence of acid, if it is desired to provide acidic groups within the polymer, esters such as t-butyl acrylate or isobornyl methacrylate may be used, and the residues of these monomers within the final polymer hydrolyzed to provide acrylic or methacrylic acid residues.

When it is desired to produce charged or chargeable groups on the composite particles and also polymeric stabilizers separately attached to the particles, it may be very convenient to treat the particles with a mixture of two reagents, one of which carries the charged or chargeable group (or a group which will eventually be treated to produce the desired charged or chargeable group), and the other of which carries the polymerizable or polymerization-initiating group. Desirably, the two reagents have the same, or essentially the same, functional group which reacts with the particle surface so that, if minor variations in reaction conditions occur, the relative rates at which the reagents react with the particles will change in a similar manner, and the ratio between the number of charged or chargeable groups and the number of polymerizable or polymerization-initiating groups will remain substantially constant. It will be appreciated that this ratio can be varied and controlled by varying the relative molar amounts of the two (or more) reagents used in the mixture.

The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

The solvent in which the composite particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-Corning (DC-200).

Charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be incorporated in the electrophoretic fluid. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 371 or 1200 (available from Chevron Oronite Company LLC, Houston, Tex.), or Solsperse 19000 and Solsperse 17000 (available from Avecia Ltd., Blackley, Manchester, United Kingdom; "Solsperse" is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See U.S. Pat. No. 7,170,670, the entire disclosure of which is herein incorporated by reference.

EXAMPLES

The following examples are given as illustrative embodiments of the present invention, and are not intended to limit the scope of the invention.

Step 1:
Sample 1
Approximately 2 g of Solvent Blue 70 was dissolved in a solution of 10 g of Bayhydur 302 and 10 g tetrahydrofuran (THF) at room temperature (approximately 20° C.). The solution was then added subsurface by means of a pipette to a stirred flask containing deionized water (100 g) at 25° C. The mixture so formed was stirred overnight and then centrifuged (at 3500 rpm for 30 minutes) followed by decantation of the supernatant liquid. The cake of dyed particles that resulted was air dried, then broken up with a spatula.

Sample 2
The same process as Example 1 was repeated except that 2 g of Orasol Yellow GLN was used in place of the Solvent Blue 70.

Step 2:
4.5 g of Samples 1 and 2 were each separately combined with Isopar-E (18 g) and a Solsperse 17k (4.5 g of a 20% solution in isopar-E) in a glass jar containing a magnetic stirring bar. Glass beads of 3 mm diameter (20 g) were added and the mixture was stirred overnight to provide a slurry of small dyed particles.

Analysis by microscopy of the slurries revealed particles ranging in size from about 0.5-5 microns.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:
1. A composite particle comprising a base particle and a plurality of hydrophilic oligomeric groups on an exterior portion of the base particle, the base particle including a cross-linked polyurea and at least one of a pigment and a dye, the cross-linked polyurea forming a network through- out the base particle, wherein the hydrophilic oligomeric groups comprise polyethylene oxide, and wherein the cross-linked polyurea is created by the polymerization of a monomer or oligomer, wherein the monomer or oligomer comprises multiple isocyanate functional groups and a polyethylene oxide functional group.

2. The composite particle of claim 1, wherein the dye is insoluble in water and soluble in a water-miscible solvent.

3. The composite particle of claim 2, wherein the dye is selected from the group consisting of Solvent Blue 70, Solvent Blue 67, Solvent Blue 136, Solvent Red 127, Solvent Red 130, Solvent Red 233, Solvent Red 125, Solvent Red 122, Solvent Yellow 88, Solvent Yellow 146, Solvent Yellow 25, Solvent Yellow 89, Solvent Orange 11, Solvent Orange 99, Solvent Brown 42, Solvent Brown 43, Solvent Brown 44, Solvent Black 28, Solvent Black 29, and combinations thereof.

4. The composite particle of claim 1, wherein the exterior portion of the base particle further comprises amino groups.

5. An electrophoretic medium containing the composite particle of claim 1 and a non-polar fluid.

6. The electrophoretic medium of claim 5, wherein the non-polar fluid comprises C6-C18 branched alkanes.

* * * * *